United States Patent [19]

Kusumegi et al.

[11] Patent Number: 5,895,585
[45] Date of Patent: Apr. 20, 1999

[54] DEVICE FOR CONFIRMING OPENING OF WELDING GUN

[75] Inventors: Kenji Kusumegi, Sayama, Japan; Toshihiro Murakawa, Columbus, Ohio

[73] Assignee: Honda Giken Kogyo Kabushiki Kaisha, Tokyo, Japan

[21] Appl. No.: 08/861,819

[22] Filed: May 23, 1997

[30] Foreign Application Priority Data

May 23, 1996 [JP] Japan .................. 8-128680

[51] Int. Cl.$^6$ .................................................. B23K 11/30
[52] U.S. Cl. .................................................. 219/86.41
[58] Field of Search .................. 219/86.41, 109, 219/110

[56] References Cited

U.S. PATENT DOCUMENTS

| | | |
|---|---|---|
| 4,207,564 | 6/1980 | Isakson et al. . |
| 4,861,959 | 8/1989 | Cecil .................. 219/86.41 |
| 4,875,009 | 10/1989 | Leveque . |
| 4,970,361 | 11/1990 | Fuse .................. 219/86.41 |
| 4,984,171 | 1/1991 | Tsujii .................. 219/86.41 |

FOREIGN PATENT DOCUMENTS

| | | |
|---|---|---|
| 0044287 | 1/1982 | European Pat. Off. . |
| 48-25014 | 3/1973 | Japan . |
| 58-9287 | 7/1981 | Japan . |
| 1-151986 | 10/1989 | Japan . |
| 3-24385 | 3/1991 | Japan . |
| 4-39581 | 4/1992 | Japan . |
| 2218025 | 11/1989 | United Kingdom . |

*Primary Examiner*—Clifford C. Shaw
*Attorney, Agent, or Firm*—Birch, Stewart, Kolasch & Birch, LLP

[57] ABSTRACT

A device for confirming an open state of a welding gun having a reciprocating mechanism or moving a movable electrode into and out of contact with a workpiece has a pin feeler mounted on an end of a cylinder of the reciprocating mechanism and movable into and out of contact with a piston movably disposed in the cylinder. The device also has a helical compression spring for resiliently biasing the pin feeler, a housing accommodating the biasing means, and a proximity switch fixedly mounted in the housing. When the piston moves in a direction to open the welding gun, the piston presses and moves the pin feeler until an end of the pin feeler is detected by the proximity switch to confirm the open state of the welding gun. The open state of the welding gun can be detected without being adversely affected by dust and dirt particles, grease, and a mist in the cylinder. The device can be assembled highly efficiently.

10 Claims, 4 Drawing Sheets

DEVICE FOR CONFIRMING OPENING OF WELDING GUN

BACKGROUND OF THE INVENTION

1. Field of the Invention

The present invention relates to a device for confirming the opening of a welding gun, i.e., a spaced-apart condition of welding electrodes thereof, used in spot welding, resistance welding, or the like, and more particularly to a device for confirming the opening of a welding gun, the device having a reciprocating mechanism for moving a movable electrode into and out of contact with a workpiece.

2. Description of the Related Art

Resistance welding is a welding process in which a large electric current is passed through joint areas of workpieces to melt the joint areas with the heat produced from resistance of the workpieces, and a pressure is applied to join the melted joint areas to each other. The resistance welding processes are largely classified into lap resistance welding and butt resistance welding.

The lap resistance welding is a welding process which welds thin overlapping metal plates to each other. The lap resistance welding processes include a spot welding process, a projection welding process, and a seam welding process. According to the spot welding process, the two overlapping workpieces are sandwiched between electrodes, and an electric current is passed through joint areas of the workpieces while they are kept under pressure for locally heating the joint areas, producing coalescence of the joint areas with the generated heat thereby to weld the joint areas to each other. According to the projection welding process, protrusions of the joint areas of the workpieces are held against each other, and an electric current is passed through the joint areas while they are kept under pressure for thereby welding the joint areas at several spots in one welding cycle. According to the seam welding process, thin metal plates are continuously welded by roller electrodes which pass an electric current through the thin metal plates while holding them under pressure.

The butt resistance welding is a welding process for welding together two wires or rods which are held end to end against each other in alignment. The butt resistance welding processes are divided into an upset welding process, a flash welding process, and a butt seam welding process. According to the upset welding process, the ends of two workpieces are held against each other, and joined together by the Joule heat obtained when an electric current flows through the workpieces and under a pressure applied to the workpieces. According to the flash welding process, the ends of two workpieces are not strongly pressed against each other in an initial stage of the application of an electric current, causing the contacting ends to be melted and scattered as sparks while heating the joint areas to a sufficiently high temperature, and then the joint areas are strongly pressed against each other, so that they are welded to each other fully across their surfaces. According to the butt seam welding process, pipe ends are welded to each other to produce a pipe seam.

Welding machines, generally called welding guns, for carrying out the resistance welding have a reciprocating mechanism for moving a movable electrode into and out of contact with workpieces, and a welding transformer for passing an electric current through the movable electrode and a fixed electrode which are held against the workpieces. When a resistance welding process, e.g., a spot welding process, is carried out on workpieces by a welding gun, the workpieces are welded at several points thereon by the welding gun. At this time, movable and fixed electrodes are mounted on respective arms that are movable vertically and horizontally, the movable and fixed electrodes having confronting electrode faces. The workpieces are welded by the movable and fixed electrodes at successive points thereon while the arms are being intermittently moved. Alternatively, the arms are fixed, and a table with the workpieces fixedly mounted thereon is moved while the workpieces are welded by the movable and fixed electrodes at successive points thereon.

In the spot welding process, after it has been confirmed that the welding at a point is fully completed, a next point is welded. The completion of the welding at each point is confirmed by confirming the welding-gun-opening displacement of a piston of a piston-actuated reciprocating mechanism which moves the movable electrode, i.e., the state in which the movable and fixed electrodes are spaced a maximum distance from each other. In this manner, it is confirmed that the welding gun is completely opened before the next point is welded, for thereby avoiding an operation failure (caused by incomplete opening of the welding gun) due to sticking together of electrode tips at the time of welding the next point.

One conventional device for confirming the welding-gun-opening displacement of the piston comprises a displacement detector positioned between a pair of gun arms for detecting a displacement of the gun arms to detect the open state of the welding gun, as disclosed in Japanese laid-open utility model publication No. 48-25014. Another device for confirming the welding-gun-opening displacement of the piston, as disclosed in Japanese laid-open utility model publication No. 1-151986, comprises a displacement detector such as an optical distance sensor mounted in a pressurizing cylinder for detecting the position of a piston of the pressurizing cylinder thereby to confirm the welding-gun-opening displacement of the piston.

The device revealed in the latter publication is advantageous in that since the optical distance sensor is mounted in the pressurizing cylinder, it is not subject to a magnetic field generated by an electric current flowing through the gun arms, and hence is capable of accurately detecting the opening of the welding gun even when the electric current flows through the gun arms. The optical distance sensor which detects the welding-gun-opening displacement of the piston in a contactless manner is free of wear-induced damage or failure that would otherwise happen to contact-type detectors. However, the optical distance sensor directly mounted in the pressurizing cylinder suffers various shortcomings described below.

In the pressurizing cylinder which moves the movable electrode, the piston is axially displaced under a fluid pressure such as a pneumatic pressure or the like. Therefore, dust or dirt particles or a mist in the cylinder tend to float and be deposited on the photodetector surface of the optical distance sensor. When this occurs, the photodetector surface becomes blurred by the deposited matter, lowering the sensitivity (detecting capability) of the optical distance sensor.

When the piston is first inserted into the cylinder in an assembling procedure, a sliding lubricant such as grease or the like is coated on the inner surface of the cylinder. The coated grease is apt to be applied to the photodetector surface, also lowering the sensitivity of the optical distance sensor.

To avoid the above drawbacks, it is necessary to check the sensitivity of the optical distance sensor after it has been installed in the cylinder. If the sensitivity of the optical distance sensor is found not sufficiently high, then the optical distance sensor has to be removed and installed again for desired sensitivity.

The process of checking the sensitivity of the optical distance sensor and possibly reinstalling the optical distance sensor makes the assembling procedure complex and time-consuming.

SUMMARY OF THE INVENTION

It is therefore an object of the present invention to provide a device for confirming the opening of a welding gun by detecting the welding-gun-opening displacement of a piston in a cylinder without being affected by dust or dirt particles, a mist, and grease, the device being assemblable highly efficiently.

Another object of the present invention is to provide a device for confirming the opening of a welding gun, which can be assembled in a reduced installation space.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

The principles of the present invention will be described below as being applied to a device for confirming the opening of a welding gun which is to spot-weld workpieces.

Prior to describing the device itself, the welding gun will first be described below.

The welding gun is mounted on a tip end of an articulated arm rotatably supported on a column which is vertically installed on a floor. In operation, the articulated arm is rotated about the column by an actuator, and various segments of the articulated arm are rotated through joints to position the welding gun for spot-welding workpieces fixedly mounted on a workpiece table at successive welding points on the workpieces.

Figure 2:
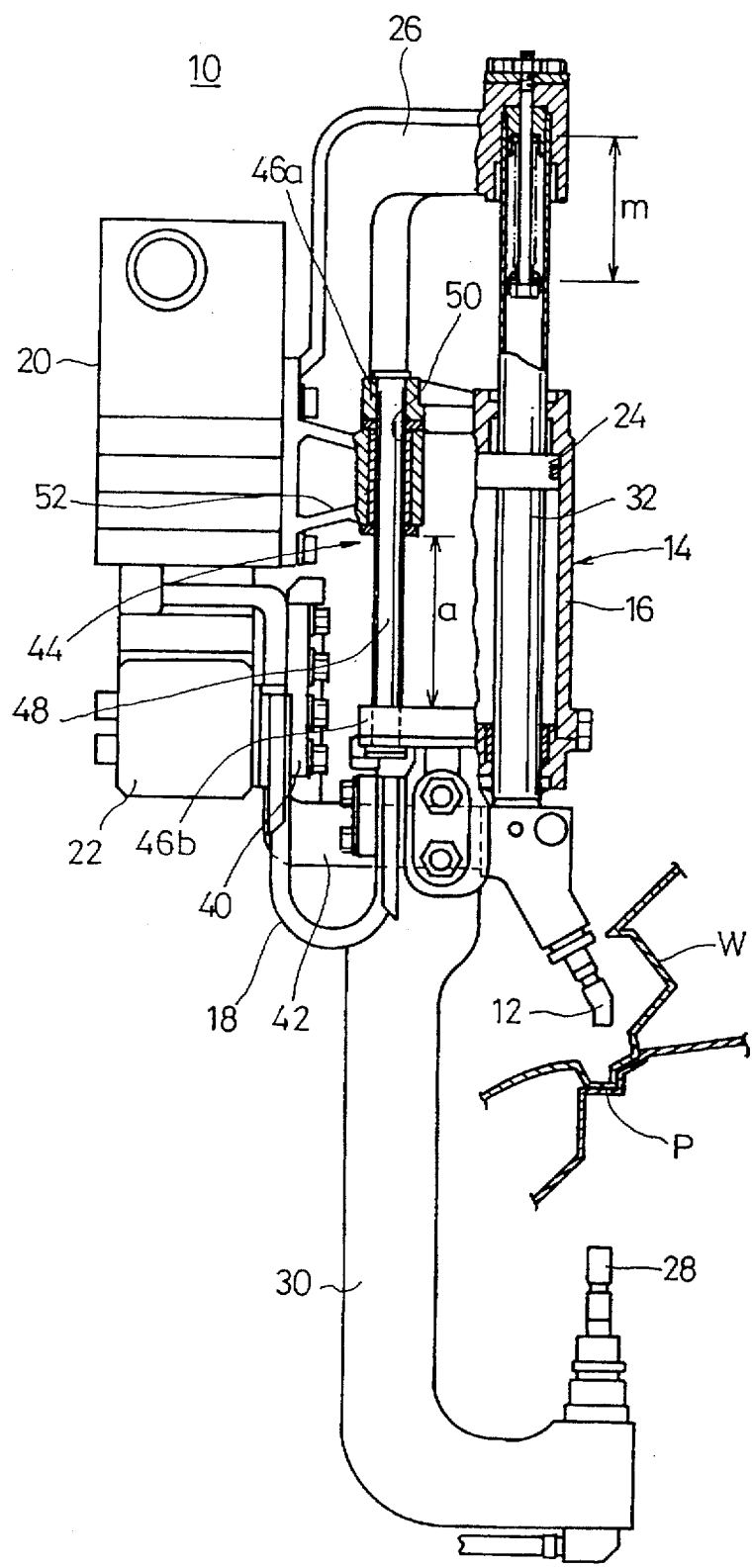
FIG. 2 is a side elevational view, partly broken away, of the welding gun as viewed in the direction indicated by the arrow A in FIG. 1A, the view showing the parts of the welding gun which are about to spot-weld the workpieces (with the welding gun being open)

Specific details of the welding gun will be described below with reference to FIG. 2. As shown in FIG. 2, the welding gun, generally denoted by 10, comprises a piston-actuated reciprocating mechanism 14 for pressing a movable electrode 12 against workpieces W, an air pump 20 fixed to the tip end of the articulated arm for supplying air through a pipe 18 into a cylinder 16 of the reciprocating mechanism 14, an electric energizing unit 22 fixed to a lower surface of the air pump 20 and having a welding transformer (not shown) incorporated therein, an inverted L-shaped first support arm 26 fixed to a lateral side of the air pump 20, the reciprocating mechanism 14 having a piston 24 slidably disposed in the cylinder 16 and vertically movably supported by the first support arm 26, and an L-shaped second support arm 30 fixed to a lower surface of the cylinder 16 and supporting a backup electrode 28 fastened to a lower tip end thereof by a bolt or the like.

Figure 1A:
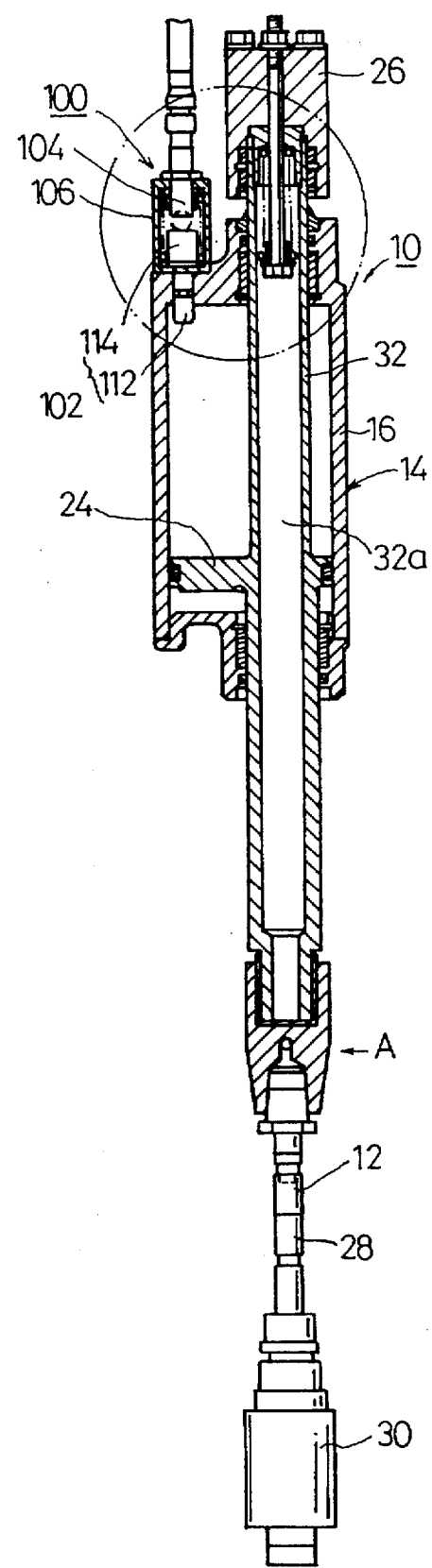
FIG. 1A is a cross-sectional view of a device for confirming the opening of a welding gun according to the present invention, the welding gun being used to spot-weld workpieces.
Figure 1B:
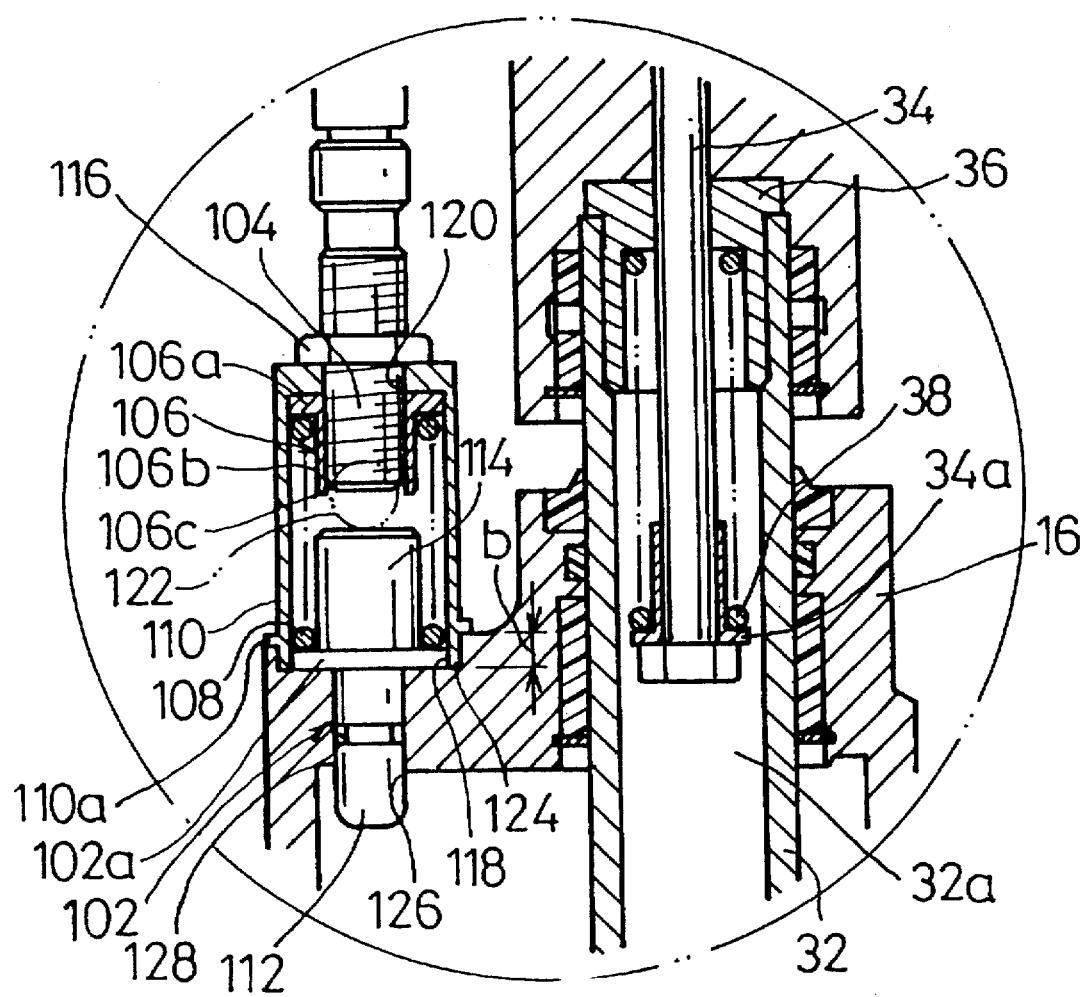
FIG. 1B is an enlarged cross-sectional view of an encircled portion of the device shown in FIG. 1A.

As also shown in FIG. 1A, the piston 24 has a vertically extending hollow piston rod 32 with a hollow space 32a defined therein which has an open upper end. As shown in FIG. 1B, a support rod 34 extending downwardly from the tip end of the first support arm 26 is inserted through the open upper end downwardly into the hollow space 32a through a central hole defined in a cap 36 which is mounted in the open upper end of the hollow space 32a. The support rod 34 has an integral flange 34a on a lower end thereof which supports a lower end of a helical compression spring 38 disposed around the support rod 34. The upper end of the helical compression spring 38 is held against a lower end of the cap 36. The helical compression spring 38 normally urges the support rod 34 to move upwardly for allowing the movable electrode 12 to be released quickly from the workpieces W when it is no longer pressed, thereby minimizing expulsions and surface flashes.

As shown in FIG. 2, the movable electrode 12 is fastened to the lower end of the piston rod 32 by screws or the like. The movable electrode 12 is also fastened by bolts or the like to an L-shaped third support arm 42 vertically movably supported on a slide mechanism 40 mounted on a lateral side of the electric energizing unit 22. When the piston rod 32 moves vertically, the movable electrode 12 also moves vertically in unison with the third support arm 42.

The cylinder 16 is vertically movably guided by a guide mechanism 44. The guide mechanism 44 comprises a pair of vertically spaced arms 46a, 46b extending horizontally from respective upper and lower ends of the cylinder 16, a guide rod 48 extending vertically between and fixed to the arms 46a, 46b, and a guide arm 52 projecting as a stopper horizontally from the air pump 20 and having a vertical through hole 50 defined in a distal end thereof. The guide rod 48 slidably extends through the through hole 50 for thereby guiding the cylinder 16 for vertical movement with respect to the air pump 20 and the first support arm 26 secured thereto.

When air under pressure is supplied from the air pump 20 into the cylinder 16, the cylinder 16 moves upwardly over a predetermined stroke, and when air under pressure is discharged from the cylinder 16, the cylinder 16 moves downwardly over the predetermined stroke, as described below.

Figure 3:
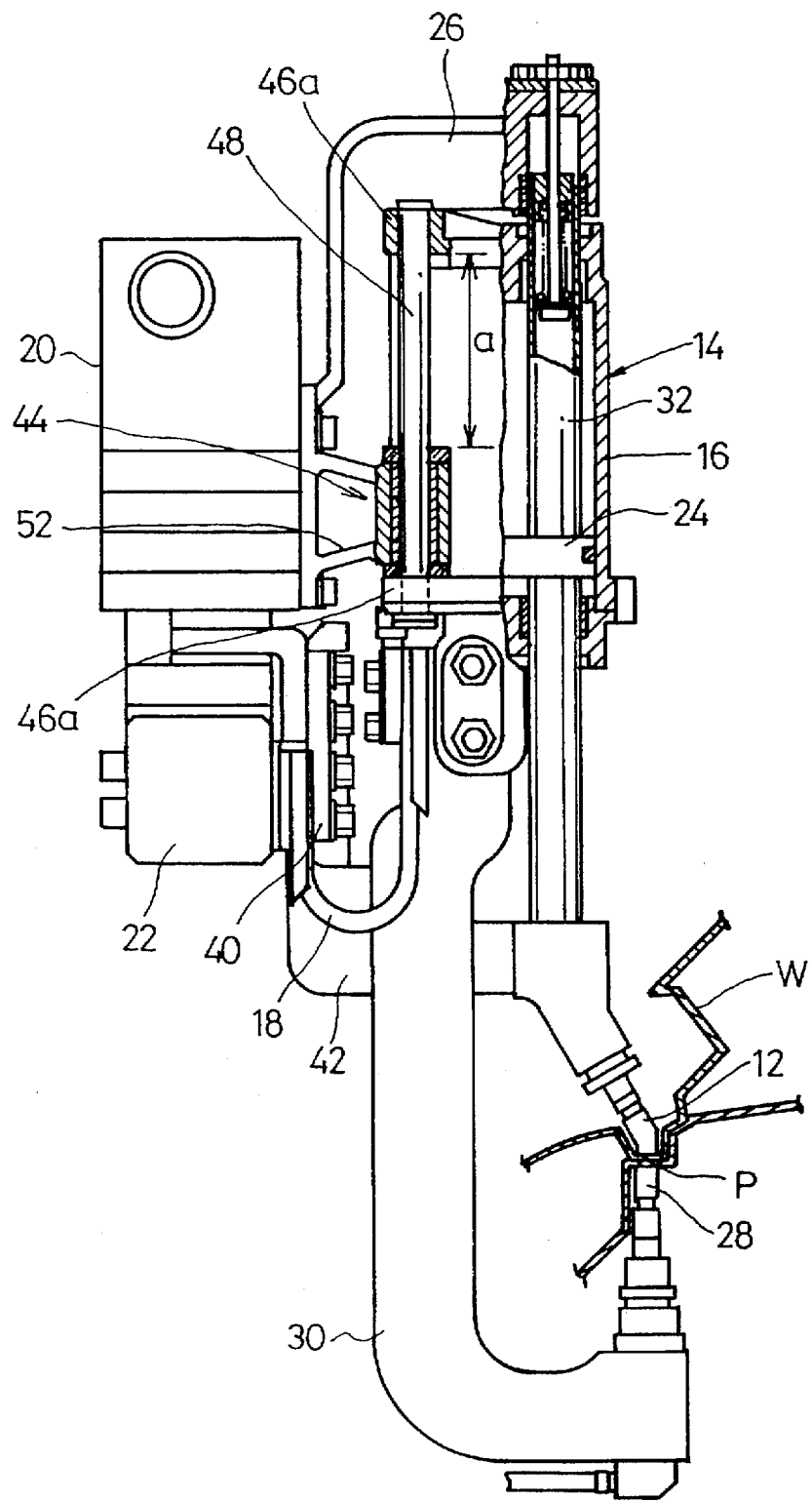
FIG. 3 is a side elevational view, partly broken away, of the welding gun as viewed in the direction indicated by the arrow A in FIG. 1A, the view showing the parts of the welding gun which are spot-welding the workpieces at a point thereon.

A spot-welding process carried out by the welding gun 10 and a cycle of movement of the cylinder 16 and the piston 24 will be described below with reference to FIGS. 2 and 3. The space above the piston 24 in the cylinder 16 will hereinafter be referred to as an "upper space", and the space below the piston 24 in the cylinder 16 as a "lower space." The pipe 18 is connected through a directional control valve (not shown) to air ports (not shown) which are open into the upper and lower spaces, respectively, in the cylinder 16.

As shown in FIG. 2, when air under pressure is supplied from the air pump 20 into the upper space in the cylinder 16 and air under pressure is discharged from the lower space in the cylinder 16, the cylinder 16 moves upwardly while being guided by the guide mechanism 44. As long as the cylinder 16 moves upwardly within a distance "a" (see FIG. 2), no forces act on the helical compression spring 38 mounted in the upper end of the piston rod 32, and hence the helical compression spring 38 keeps its length "m" in its free state. The second support arm 30 with the backup electrode 28 mounted thereon also moves upwardly in unison with the cylinder 16. When the cylinder 16 has moved upwardly over the distance "a", the upper surface of the arm 46b attached to the lower end of the cylinder 16 abuts against the lower end of the guide arm 52, whereupon the cylinder 16 is prevented from further moving upwardly. The backup electrode 28 is now held in a fixed position and has its upper electrode face held against a lower surface of a welding point P on the workpieces W.

Air under pressure from the air pump 20 is further introduced into the upper space in the cylinder 16 and at the same time air under pressure is further discharged from the lower space in the cylinder 16. The piston 24 in the cylinder 16 is moved downwardly under the air pressure against the bias of the helical compression spring 38, thus compressing the helical compression spring 38. The downward displacement of the piston 24 causes the lower electrode face of the movable electrode 12 fixed to the lower end of the piston rod 32 to be held against the upper surface of the welding point P which is supported by the backup electrode 28. Therefore, the welding point P is sandwiched between the electrode faces of the movable and backup electrodes 12, 28.

Then, a welding current is supplied from the welding transformer of the electric energizing unit 22 to flow between the movable and backup electrodes 12, 28. At the same time, air under pressure is further introduced into the upper space in the cylinder 16. Therefore, the welding point P of the workpieces W is pressurized while at the same time the electric current is being passed therethrough, thus spot-welding the welding point P (see FIG. 3).

When the spot-welding of the welding point P is over, the air pump 20 starts discharging the air from the upper space in the cylinder 16 and also starts supplying air under pressure into the lower space in the cylinder 16. The cylinder 16 now moves downwardly while being guided by the guide mechanism 44, and the piston 24 also moves upwardly in unison therewith and also under the energy stored by the helical compression spring 38. The cylinder 16 continues to move downwardly until the lower surface of the arm 46a abuts against the upper end of the guide arm 52, and the piston 24 reaches its top dead center, whereupon the welding gun 10 is opened, i.e., the movable and backup electrodes 12, 28 are spaced apart from each other, as shown in FIG. 2.

Generally, when coated steel panels such as galvanized steel panels for use as automobile body panels are spot-welded, the zinc layer placed as a rust-prevention layer is melted earlier than the steel panels itself due to the heat produced from resistance of the steel panels, and tends to be applied to the electrode tips, e.g., the tip of the movable electrode 12. When the melted zinc is applied to the electrode tips, the density of the welding current flowing through the electrodes is lowered, failing to achieve a sufficient welding strength on the welded workpieces. Workpieces thus welded are liable to suffer different welding strengths. The deposition of the melted metal on the electrode tips cause the electrode tips to stick to the welding point P, so that the electrodes cannot be returned to their initial spaced-apart positions, i.e., the welding gun cannot be opened. When the electrode tips stick to the welding point P, it is necessary to replace or service the electrode tips quickly.

It is therefore important in the spot-welding process to detect accurately the timing of the opening of the welding gun in an early stage in order to increase the productivity of welded workpieces W.

A device 100 (see FIGS. 1A and 1B) for confirming the opening of the welding gun 10 according to the present invention is incorporated in the welding gun 10 for accurately detecting the timing of the opening of the welding gun 10 in an early stage. As shown in FIG. 1B, the device 100 comprises a pin feeler 102 of synthetic resin or metal mounted on an upper end of the cylinder 16 and having a flange 102a located at a longitudinally central position thereon, a proximity switch 104 positioned such that its detecting surface faces an end of the pin feeler 102, a collar 106 disposed around the proximity switch 104 and having a flange 106a on an end thereof, a helical compression spring 108 disposed between the flange 102a and the flange 106a, and a cylindrical housing 110 mounted on the upper end of the cylinder 16 and accommodating therein at least a portion of the pin feeler 102, the detecting surface of the proximity switch 104, the collar 106, and the helical compression spring 108.

The pin feeler 102 has an actuating pin 112 projecting into the cylinder 16 from the flange 102a and a detectable pin 114 projecting remotely from the actuating pin 112 from the flange 102a and having a diameter larger than the actuating pin 112.

The proximity switch 104 may be of the high-frequency oscillation type, the induction bridge type, the magnetic type, or the electrostatic capacitance type depending on the material of the pin feeler 102. The proximity switch 104 has a cylindrical outer shape with its outer circumferential surface being externally threaded, and projects partly into the housing 110. A nut 116 is threaded over the externally threaded outer circumferential surface of the proximity switch 104 to hold the proximity switch 104 on the housing 110. The length of the proximity switch 104 which is inserted into the housing 10 can be adjusted by the nut 116.

The collar 106 has a tubular member 106b having an inside diameter which is substantially the same as the outside diameter of the proximity switch 104. The flange 106a is positioned on an upper end of the tubular member 106b, and a ring-shaped engaging portion 106c is integrally formed with a tip end of the tubular member 106b remote from the flange 106a. The ring-shaped engaging portion 106a has a diameter smaller than the outside diameter of the proximity switch 104. The ring-shaped engaging portion 106c has a height or projection selected to lie within the detectable range (smaller than a detectable critical length) of the proximity switch 104. In the illustrated embodiment, the height of the ring-shaped engaging portion 106c is about 0.5 mm which is one half of 1 mm that is the detectable critical length of the proximity switch 104.

The housing 110 is of a cylindrical shape having an opening 118 defined in a lower end thereof through which the pin feeler 102 is slidably inserted, and a threaded hole 120 defined in an upper end thereof in which the proximity switch 104 is threaded. The threaded hole 120 and the nut 116 threaded over the proximity switch 104 jointly serve as a positioning means for positioning the proximity switch 104 with respect to the housing 110. Specifically, when the nut 116 is turned clockwise or counterclockwise, the proximity switch 104 is axially moved gradually into or out of the housing 110. The proximity switch 104 can thus axially be positioned at a desired location when the nut 116 is angularly moved. In the illustrated embodiment, the proximity switch 104 is positioned such that the detecting surface thereof is axially spaced about 0.5 mm from the upper surface of the ring-shaped engaging portion 106c of the collar 106. Therefore, the ring-shaped engaging portion 106c projects downwardly from the detecting surface of the proximity switch 104 by a distance of 1 mm, which is equal to the detectable critical length of the proximity switch 104.

The housing 110 also has an annular ridge 110a integrally formed on an outer circumferential surface thereof and axially spaced by a distance "b" from the end of the housing 110 where the opening 118 is defined. The end portion of the housing 110 from the annular ridge 110a to the end of the housing 110 where the opening 118 is defined, i.e., the end portion having the length "b" serves as an attachment portion by which the housing 110 is mounted on the upper end of the cylinder 16.

The housing 110 further has a visual inspection hole 122 defined in an outer circumferential wall thereof for allowing the operator to see the detecting surface of the proximity switch 104 and surrounding areas. If the housing 110 is made of a transparent synthetic resin, however, the visual inspection hole 122 may be dispensed with.

The upper end of the cylinder 16 has an attachment recess 124 defined therein at a location remotest from the piston rod 32. The attachment recess 124 receives the attachment portion of the housing 110. The upper end of the cylinder 16 also has a through hole 126 defined vertically therethrough at the center of the attachment recess 124, and the actuating pin 112 extends through the through hole 126 and has a lower end projecting into the upper space in the cylinder 16. In order to hermetically seal the cylinder 16, it is preferable to fit an O-ring 128 around the actuating pin 112 at a longitudinally central portion thereof, for example.

The device 100 is installed on the welding gun 10 as follows:

The collar 106 is inserted into the housing 110 through the opening 118. If necessary, the end of the collar 106 at the flange 106a is bonded to the inner axial end of the housing 110 by an adhesive or the like. Then, the helical compression spring 108 is inserted into the housing 110 through the opening 118. With the opening 118 closed by the pin feeler 102, the actuating pin 112 is inserted into the through hole 126 in the cylinder 16, and the attachment portion of the housing 110 is fitted and fixed in the attachment recess 124 in the cylinder 16.

Thereafter, the proximity switch 104 is threaded into the threaded hole 120 in the housing 110 such that the detecting surface thereof is placed in the housing 110. The proximity switch 104 is threaded into the threaded hole 120 while the operator is visually checking the displacement of the proximity switch 104 through the visual inspection hole 122 in the housing 110. After the proximity switch 104 is threaded in to a certain extent, the nut 116 is turned to adjust the position of the proximity switch 104 until the detecting surface of the proximity switch 104 reaches a predetermined position which is spaced about 0.5 mm upwardly from the upper surface of the ring-shaped engaging portion 106c of the collar 106. The assembling process is finished when the detecting surface of the proximity switch 104 reaches the predetermined position as described above.

Operation of the device 100 immediately after the welding gun 10 has spot-welded the workpieces W will be described below. As shown in FIG. 3, after the welding gun 10 has spot-welded the workpieces W at the welding point P, the piston 16 moves downwardly and the piston 24 moves upwardly relatively to the piston 16.

Immediately before the piston 24 reaches its top dead center, the lower end of the actuating pin 112 contacts the upper surface of the piston 24. Upon further relative upward displacement of the piston 24, the actuating pin 112 is pressed upwardly by the upper surface of the piston 24 against the bias of the helical compression spring 108, and the pin feeler 102 is displaced upwardly.

When the upper end of the detectable pin 114 abuts against the lower end of the ring-shaped engaging portion 106c due to the upward displacement of the piston 24, the upper end of the detectable pin 114 enters the detectable range of the proximity switch 104, which outputs a signal indicating that it has detected the pin feeler 102.

The signal outputted from the proximity switch 104 is supplied to a controller (not shown) electrically connected to the proximity switch 104. The controller is implemented as a digital circuit or a signal-processing program stored in a memory, and serves as a means for determining an open state of the welding gun 10.

The controller decides that the welding process has ended normally if the signal from the proximity switch 104 is supplied within the duration of a window pulse which is high in level for a certain period of time after the end of the welding process, and that the welding process has ended abnormally if the signal from the proximity switch 104 is not supplied within the duration of the window pulse.

When the controller decides that the welding process has ended normally, the controller sends a signal to the actuator of the articulated arm in response to the signal from the proximity switch 104 for thereby moving the welding gun 10 to a next welding point P. The controller also sends message data indicative of the normal ending of the welding process to a display monitor connected thereto. The display monitor converts the message data into image data and displays a message representing the normal ending of the welding process on its monitor screen.

If the tip of the movable electrode 12 sticks to the welding point P due to the melted metal on the welding point P, then since the piston 24 cannot move upwardly relatively to the cylinder 16, the proximity switch 104 does not output a signal, and the controller decides that the welding process has ended abnormally as described above.

When the controller decides that the welding process has ended abnormally, the controller does not send a signal to the actuator of the articulated arm and sends message data indicative of the abnormal ending of the welding process to the display monitor and also an alarm signal to an alarm device. The display monitor converts the message data into image data and displays a message representing the abnormal ending of the welding process on its monitor screen. The alarm device outputs an alarm based on the alarm signal from the controller.

Prompted by the alarm from the alarm device or the displayed message representing the abnormal ending of the welding process, the operator starts replacing the tip of the movable electrode 12 and effecting a maintenance process on the movable electrode 12.

When the welding gun 10 starts to spot-weld the workpieces W at another welding point P and the piston 24 moves downwardly, the pin feeler 102 is released from the piston 24, and hence returns downwardly under the bias of the helical compression spring 108.

As described above, the device 100 does not directly detect the displacement of the piston 24 to open the welding gun 10 with the proximity switch 104, but rather indirectly detects the displacement of the piston 24 to open the welding gun 10 by detecting the end of the detectable pin 114 of the pin feeler 102 which is pressed by the piston 24 in the direction to open the welding gun 10. Therefore, the sensitivity of the proximity switch 104 is not adversely affected by dust and dirt particles, grease, and a mist in the cylinder 16, but is maintained at a constant level for reliably detecting the open state of the welding gun 10.

The helical compression spring 108 in the housing 110 functions as a damper for dampening the movement of the pin feeler 102 toward the proximity switch 104. Consequently, the pin feeler 102 is prevented from abruptly moving toward the proximity switch 104 and hence from striking the detecting surface of the proximity switch 104.

Since the pin feeler 102 is mounted on the upper end of the cylinder 16 and the helical compression spring 108 and the proximity switch 104 are accommodated in the housing 110, they are assembled in a highly compact configuration. Inasmuch as the sensitivity of the proximity switch 104 does not need to be adjusted after the proximity switch 104 has been assembled in place, it can be assembled with high efficiency. As a result, the device 100 can be manufactured relatively inexpensively.

The visual inspection hole 122 for visually inspecting the detecting surface of the proximity switch 104 and surrounding areas is defined in the outer circumferential wall of the housing 110. Therefore, the positional relationship between the end of the detectable pin 114 and the proximity switch 104 in the housing 110 can visually be confirmed quickly through the visual inspection hole 122.

Inasmuch as the distance by which the detecting surface of the proximity switch 104 is inserted into the housing 110 is adjustable by the positioning means for positioning the proximity switch 104 with respect to the housing 110, the positioning of the proximity switch 104 in the housing 110 can easily be performed. The device 100 can easily be installed on the upper end of the cylinder 16. The proximity switch 104 can accurately be installed in a position taking into account the stroke of the pin feeler 102.

The collar 106 engaging the proximity switch 104 is disposed in the housing 110. The end of the helical compression spring 108 near the proximity switch 104 is fitted in the housing 110 through the collar 106. This allows the helical compression spring 108 to be easily installed in the housing 110. Since the end of the helical compression spring 108 is fixed in position by the collar 106, when the pin feeler 102 is pressed by the movement of the piston 24 to open the welding gun 10 and the detectable pin 114 moves toward the proximity switch 104, the pin feeler 102 does not move obliquely to the proximity switch 104, but moves straight toward the proximity switch 104. Consequently, the upper end of the detectable pin 114 can accurately be detected by the proximity switch 104, which thus detect highly accurately the displacement of the piston 24 to open the welding gun 10.

The height (projection) of the ring-shaped engaging portion 106c of the collar 106 is selected to be smaller than the detectable range (detectable critical length) of the proximity switch 104. The proximity switch 104, the pin feeler 102, and other members can thus be accurately assembled without confirming the positional relationship between the proximity switch 104 and the pin feeler 102. The device 100 can therefore be assembled highly efficiently.

The present invention has been described with respect to the welding gun 10 which performs the spot-welding process. However, the principles of the present invention are applicable to a welding machine for carrying out other resistance welding processes including the projection welding process, the seam welding process, the upset welding process, the flash welding process, and the butt seam welding process.

Although a certain preferred embodiment of the present invention has been shown and described in detail, it should be understood that various changes and modifications may be made therein without departing from the scope of the appended claims.

What is claimed is:

1. A device for confirming an open state of a welding gun having a reciprocating mechanism for moving a movable electrode into and out of contact with a workpiece, comprising:

a pin feeler adapted to be mounted on an end of a cylinder of the reciprocating mechanism and movable into and out of contact with a piston movably disposed in the cylinder;

biasing means for resiliently biasing said pin feeler;

a housing accommodating said biasing means; and a proximity switch fixedly mounted in said housing;

the arrangement being such that when the piston moves in a direction to open the welding gun, the piston presses and moves said pin feeler until an end of the pin feeler is detected by said proximity switch to confirm the open state of the welding gun.

2. A device according to claim 1, wherein said housing has a hole for visually inspecting the end of the pin feeler and surrounding areas.

3. A device according to claim 1, wherein said proximity switch is fixed to said housing while allowing a distance by which a detecting surface of the proximity switch is inserted in said housing to be adjustable.

4. A device according to claim 3, wherein said proximity switch is of a cylindrical outer shape and has an externally threaded outer circumferential surface, further comprising a nut threaded over said externally threaded outer circumferential surface for adjusting the distance by which the detecting surface of the proximity switch is inserted in said housing.

5. A device according to claim 1, wherein said housing has an opening defined in an end thereof through which said pin feeler is movably inserted, and a threaded hole defined in an opposite end thereof though which said proximity switch is threaded, further comprising a nut threaded over said proximity switch, said threaded hole and said nut jointly serving as positioning means for positioning said proximity switch with respect to said housing.

6. A device according to claim 1, further comprising a collar disposed in said housing and engaging said proximity switch.

7. A device according to claim 6, wherein said collar has an end projecting beyond a detecting surface of the proximity switch toward said pin feeler.

8. A device according to claim 6, wherein said collar has a tubular member having an inside diameter which is substantially the same as an outside diameter of said proximity switch, said tubular member having on a tip end thereof a ring-shaped engaging portion having a diameter smaller than the outside diameter of the proximity switch, said ring-shaped engaging portion having a height selected to lie within a detectable range of said proximity switch.

9. A device according to claim 8, wherein said detectable range of said proximity switch is equal to a detectable critical length of said proximity switch.

10. A device according to claim 1, wherein said housing is made of a transparent resin material.

* * * * *